United States Patent
Hause et al.

(10) Patent No.: US 8,016,194 B2
(45) Date of Patent: Sep. 13, 2011

(54) MOBILE DATA STORAGE DEVICE READER HAVING BOTH RADIOFREQUENCY AND BARCODE SCANNERS

(75) Inventors: Curtis B. Hause, Lake Elmo, MN (US); Sanjay Gupta, Woodbury, MN (US); Stephen J. Rothermel, Roseville, MN (US); Jody L. Gregg, Lake Elmo, MN (US)

(73) Assignee: Imation Corp., Oakdale, MN (US)

(*) Notice: Subject to any disclaimer, the term of this patent is extended or adjusted under 35 U.S.C. 154(b) by 734 days.

(21) Appl. No.: 12/074,740

(22) Filed: Mar. 6, 2008

(65) Prior Publication Data

US 2009/0224039 A1    Sep. 10, 2009

(51) Int. Cl.
    *G06Q 30/00*    (2006.01)
(52) U.S. Cl. .................................... 235/385; 235/384
(58) Field of Classification Search .................. 235/385, 235/384, 462.01, 492
    See application file for complete search history.

(56) References Cited

U.S. PATENT DOCUMENTS

| | | | |
|---|---|---|---|
| 3,873,871 A | 3/1975 | Hofmann | |
| 4,945,428 A | 7/1990 | Waldo | |
| 5,235,695 A | 8/1993 | Pence | |
| 5,245,485 A | 9/1993 | Dunn et al. | |
| 5,253,821 A | 10/1993 | Johnson | |
| 5,278,970 A | 1/1994 | Pence | |
| 5,303,214 A | 4/1994 | Kulakowski et al. | |
| 5,315,508 A | 5/1994 | Bain et al. | |
| 5,761,503 A | 6/1998 | Fisher | |
| 5,805,864 A | 9/1998 | Carlson et al. | |
| 5,809,511 A | 9/1998 | Peake | |
| 5,910,776 A | 6/1999 | Black | |
| 5,916,717 A | 6/1999 | Yang et al. | |
| 5,935,758 A | 8/1999 | Patel et al. | |
| 5,945,249 A | 8/1999 | Patel et al. | |
| 5,949,342 A | 9/1999 | Frary et al. | |
| 5,970,273 A | 10/1999 | Zenk et al. | |
| 5,971,281 A * | 10/1999 | Frary et al. ............... | 235/487 |
| 5,982,282 A | 11/1999 | Ryan, Jr. | |
| 6,022,440 A | 2/2000 | Nordeen et al. | |
| 6,089,453 A | 7/2000 | Kayser et al. | |
| 6,100,788 A | 8/2000 | Frary et al. | |

(Continued)

FOREIGN PATENT DOCUMENTS

DE    202008004956 U1    8/2008

(Continued)

OTHER PUBLICATIONS

"Imation AquaGuard™ Technology," Article from Imation Corp's website, 2006, pp. 1-5.

(Continued)

*Primary Examiner* — Ahshik Kim
(74) *Attorney, Agent, or Firm* — Shumaker & Sieffert, P.A.

(57) ABSTRACT

A mobile reader configured to compile a list of data storage devices for transport includes an interface electrically coupled to circuitry modules including RFID scanning circuitry configured to read a unique storage device identifier from each of the data storage devices, and barcode scanning circuitry configured to read the unique storage device identifier from each of the data storage devices. The barcode scanning circuitry communicates with the RFID scanning circuitry. The interface includes a user operable function that enables selectively reading the unique storage device identifier with one of the RFID scanning circuitry or the barcode scanning circuitry to compile a scan list of in-transit data storage devices.

19 Claims, 9 Drawing Sheets

U.S. PATENT DOCUMENTS

| | | | |
|---|---|---|---|
| 6,169,483 B1 | 1/2001 | Ghaffari et al. | |
| 6,201,474 B1 | 3/2001 | Brady et al. | |
| 6,201,662 B1 | 3/2001 | Graves et al. | |
| 6,226,688 B1 | 5/2001 | Frary | |
| 6,260,006 B1 | 7/2001 | Wong et al. | |
| 6,266,211 B1 | 7/2001 | Thomas, III et al. | |
| 6,286,763 B1 * | 9/2001 | Reynolds et al. | 235/472.01 |
| 6,307,468 B1 | 10/2001 | Ward, Jr. | |
| 6,336,163 B1 | 1/2002 | Brewer et al. | |
| 6,336,173 B1 | 1/2002 | Day, III et al. | |
| 6,346,884 B1 | 2/2002 | Uozumi et al. | |
| 6,519,678 B1 | 2/2003 | Basham et al. | |
| 6,633,454 B1 | 10/2003 | Martin et al. | |
| 6,636,778 B2 | 10/2003 | Basham et al. | |
| 6,690,539 B2 | 2/2004 | Gallo et al. | |
| 6,826,004 B2 | 11/2004 | Albrecht et al. | |
| 6,845,279 B1 | 1/2005 | Gilmore et al. | |
| 6,851,617 B2 | 2/2005 | Saint et al. | |
| 6,860,609 B2 | 3/2005 | Olson et al. | |
| 6,950,723 B2 | 9/2005 | Gallo et al. | |
| 6,957,086 B2 | 10/2005 | Bahl et al. | |
| 6,999,028 B2 | 2/2006 | Egbert | |
| 7,015,817 B2 | 3/2006 | Copley et al. | |
| 7,018,454 B2 | 3/2006 | Wood et al. | |
| 7,020,755 B2 | 3/2006 | Gibble et al. | |
| 7,023,341 B2 | 4/2006 | Stilp | |
| 7,024,155 B2 | 4/2006 | Gosieski, Jr. | |
| 7,028,158 B1 | 4/2006 | Beatty et al. | |
| 7,044,605 B2 | 5/2006 | Olson et al. | |
| 7,055,750 B2 | 6/2006 | Carrender | |
| 7,055,956 B2 | 6/2006 | Olson et al. | |
| 7,066,990 B2 | 6/2006 | Wood et al. | |
| 7,070,110 B2 | 7/2006 | Lapstun et al. | |
| 7,080,277 B2 | 7/2006 | Anna et al. | |
| 7,085,895 B2 | 8/2006 | Kishi | |
| 7,089,099 B2 | 8/2006 | Shostak et al. | |
| 7,097,106 B2 | 8/2006 | Silverbrook et al. | |
| 7,098,784 B2 | 8/2006 | Easley et al. | |
| 7,128,265 B2 | 10/2006 | Silverbrook et al. | |
| 7,128,270 B2 | 10/2006 | Silverbrook et al. | |
| 7,207,486 B1 * | 4/2007 | Bennett | 235/385 |
| 7,212,127 B2 | 5/2007 | Jacober et al. | |
| 7,299,990 B2 | 11/2007 | Hoshina | |
| 7,368,032 B2 | 5/2008 | Green et al. | |
| 7,378,958 B2 | 5/2008 | Twitchell, Jr. | |
| 7,425,898 B2 | 9/2008 | Ryckman | |
| 7,481,371 B2 | 1/2009 | Heidorn | |
| 7,659,820 B2 | 2/2010 | Schnee et al. | |
| 7,660,812 B2 | 2/2010 | Findlay et al. | |
| 2001/0000019 A1 | 3/2001 | Bowers et al. | |
| 2002/0008623 A1 | 1/2002 | Garber et al. | |
| 2002/0044058 A1 | 4/2002 | Heinrich et al. | |
| 2002/0075589 A1 | 6/2002 | Unno | |
| 2002/0084324 A1 | 7/2002 | Johnson et al. | |
| 2002/0145037 A1 | 10/2002 | Goodwin, III | |
| 2002/0147650 A1 | 10/2002 | Kaufman et al. | |
| 2002/0150035 A1 | 10/2002 | Bernacki et al. | |
| 2002/0180588 A1 | 12/2002 | Erickson et al. | |
| 2002/0191322 A1 | 12/2002 | Jerman | |
| 2003/0002214 A1 | 1/2003 | Kitamura et al. | |
| 2003/0059050 A1 | 3/2003 | Hohberger et al. | |
| 2003/0227382 A1 | 12/2003 | Breed | |
| 2004/0069850 A1 | 4/2004 | De Wilde | |
| 2004/0119605 A1 | 6/2004 | Schaper | |
| 2004/0210319 A1 | 10/2004 | Lapstun et al. | |
| 2005/0021524 A1 | 1/2005 | Oliver | |
| 2005/0057847 A1 | 3/2005 | Armagost et al. | |
| 2005/0061870 A1 | 3/2005 | Stockton | |
| 2005/0092844 A1 | 5/2005 | Zhang et al. | |
| 2005/0093690 A1 | 5/2005 | Miglionico | |
| 2005/0116034 A1 | 6/2005 | Satake et al. | |
| 2005/0133583 A1 | 6/2005 | Tada | |
| 2005/0149413 A1 | 7/2005 | Amling et al. | |
| 2005/0162331 A1 | 7/2005 | Endo et al. | |
| 2005/0168339 A1 | 8/2005 | Arai et al. | |
| 2005/0261401 A1 | 11/2005 | Wood et al. | |
| 2005/0263589 A1 | 12/2005 | Kikuchi | |
| 2006/0040074 A1 | 2/2006 | Wood et al. | |
| 2006/0055552 A1 | 3/2006 | Chung et al. | |
| 2006/0118229 A1 | 6/2006 | Ohashi et al. | |
| 2006/0124738 A1 | 6/2006 | Wang et al. | |
| 2006/0132576 A1 | 6/2006 | Lowery et al. | |
| 2006/0138232 A1 | 6/2006 | Hammerslag et al. | |
| 2006/0145864 A1 | 7/2006 | Jacober et al. | |
| 2006/0169773 A1 | 8/2006 | Lyons et al. | |
| 2006/0175401 A1 | 8/2006 | Roberts | |
| 2006/0200560 A1 | 9/2006 | Waugh et al. | |
| 2006/0213989 A1 | 9/2006 | Ahmadi et al. | |
| 2006/0221363 A1 | 10/2006 | Roth et al. | |
| 2006/0250235 A1 | 11/2006 | Astrin | |
| 2006/0290491 A1 | 12/2006 | Wagner et al. | |
| 2007/0047302 A1 | 3/2007 | Haustein et al. | |
| 2007/0055686 A1 * | 3/2007 | Findlay et al. | 707/102 |
| 2007/0138281 A1 | 6/2007 | Moriyama et al. | |
| 2007/0162180 A1 | 7/2007 | Goodman et al. | |
| 2007/0162359 A1 * | 7/2007 | Gokhale et al. | 705/28 |
| 2007/0164858 A1 | 7/2007 | Webb, Sr. | |
| 2007/0188306 A1 | 8/2007 | Tethrake et al. | |
| 2007/0204493 A1 | 9/2007 | Foley et al. | |
| 2007/0215700 A1 * | 9/2007 | Reznik et al. | 235/385 |
| 2007/0253109 A1 | 11/2007 | Soeken | |
| 2007/0296581 A1 | 12/2007 | Schnee et al. | |
| 2008/0061935 A1 | 3/2008 | Melendez et al. | |
| 2008/0061979 A1 | 3/2008 | Hause et al. | |
| 2008/0065676 A1 | 3/2008 | Hause et al. | |
| 2008/0067935 A1 | 3/2008 | Lee | |
| 2008/0110778 A1 | 5/2008 | Gelardi et al. | |
| 2008/0122623 A1 | 5/2008 | Hause et al. | |
| 2008/0198022 A1 | 8/2008 | Battles et al. | |
| 2008/0268896 A1 | 10/2008 | Langlois et al. | |
| 2009/0237221 A1 | 9/2009 | Battles et al. | |
| 2010/0157766 A1 | 6/2010 | Gregg et al. | |
| 2010/0161895 A1 | 6/2010 | Qualls et al. | |
| 2010/0193589 A1 | 8/2010 | Jackson et al. | |

FOREIGN PATENT DOCUMENTS

| | | | |
|---|---|---|---|
| EP | 1 251 450 A1 | 10/2002 | |
| EP | 1225577 | 11/2004 | |
| EP | 1672565 A1 | 6/2006 | |
| JP | 3605106 B2 | 10/2004 | |
| WO | WO 01/06507 | 1/2001 | |
| WO | WO 2004/006051 A2 | 1/2004 | |

OTHER PUBLICATIONS

White paper entitled "ZigBee Technology: Wireless Control that Simply Works," Patrick Kinney, Communications Design Conference, Oct. 2, 2003, pp. 1-20.

Khan Tuan Le, "ZigBee SoCs provide cost-effective solutions," EE Times Online, Nov. 2, 2005, 9 pp.

Fujifilm 13.56 MHz LTO Cartridge Memory (LTO-CM) Data sheet, printed on or before Apr. 13, 2009, 1 p.

"Proposed Addition of Read and Write Attribute Commands to SPC-2," Document T10/99-148r7, May 4, 2000, pp. 1-23.

"hp ultrium drives technical reference manual generations 1 and 2 SCSI and FC drives, vol. 6: background to Ultrium drives," Hewlett Packard, part No. C7379-90900, edition 2, Feb. 2003, 67 pp.

ECMA Standardizing Information and Communication Systems, "Data Interchange on 12,7 mm 384-Track Magnetic Tape-Cartridges-Ultrium-1 Format," Standard ECMA-319, Jun. 2001, pp. 1-141.

International Preliminary Examination Report for international application No. PCT/US2009/001364, dated Sep. 16, 2010, 8 pp.

* cited by examiner

MOBILE DATA STORAGE DEVICE READER HAVING BOTH RADIOFREQUENCY AND BARCODE SCANNERS

BACKGROUND

Data storage devices are employed in computer, audio, and video fields for storing large volumes of information for subsequent retrieval and use. Data storage devices include data storage tape cartridges, hard disk drives, micro disk drives, business card drives, and removable memory storage devices in general. The data storage devices are useful for storing data and for backing up data systems used by businesses and government entities. For example, businesses routinely backup important information such as human resource data, employment data, compliance audits, and safety/inspection data. Government sources collect and store vast amounts of data related to tax payer identification numbers, income withholding statements, and audit information. Congress has provided additional motivation for many publicly traded companies to ensure the safe retention of data and records related to government required audits and reviews after passage of the Sarbanes-Oxley Act (Pub. L. 107-204, 116 Stat. 745 (2002)).

Collecting and storing data has now become a routine good business practice. The data is often saved to one or more data storage devices that is/are typically shipped or transferred to an offsite repository for safe/secure storage. The backup data storage devices are periodically retrieved from the offsite repository for review. The transit of data storage devices between various facilities introduces a possible risk of loss or theft of the devices and the data stored that is stored on the devices.

The issue of physical data security and provenance is a growing concern for users of data storage devices. Thus, manufacturers and users both are interested in systems and/or processes for keeping track of in-transit/in-storage data storage devices. Improvements to the tracing of data storage devices used to store data are desired by a wide segment of both the public and private business sectors.

SUMMARY

One aspect provides a mobile reader configured to compile a list of data storage devices for transport. The mobile reader includes an interface electrically coupled to circuitry modules including RFID scanning circuitry configured to read a unique storage device identifier from each of the data storage devices, and barcode scanning circuitry configured to read the unique storage device identifier from each of the data storage devices. The barcode scanning circuitry communicates with the RFID scanning circuitry. The interface includes at least one user operable function that enables selectively reading the unique storage device identifier with one of the RFID scanning circuitry or the barcode scanning circuitry to compile a scan list of in-transit data storage devices.

Another aspect provides a data storage device tracing system. The system includes a data storage device including a housing enclosing data storage media and a tag coupled to the housing, and a mobile reader. The mobile reader includes an RFID scanner configured to read a unique storage device identifier from the tag and input the storage device identifier into a scan list of in-transit data storage devices, and a barcode scanner configured to read the storage device identifier from the tag and input the storage device identifier into the scan list of in-transit data storage devices. The mobile reader is configured to select between the RFID scanner and the barcode scanner in compiling the scan list of in-transit data storage devices.

Another aspect provides a method of identifying data storage devices for transport. The method includes reading a unique storage device identifier for each data storage device in transit and compiling a list of the storage device identifiers for each data storage device in transit. Reading includes one of: RF scanning an RFID tag coupled to each data storage device in transit, and barcode scanning a barcode coupled to each data storage device in transit.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Embodiments provide a mobile reader that is configured to read a unique identifier attached to a data storage device. The mobile reader is configured to compile a list of the unique identifiers for in-transit data storage devices and to trace the in-transit data storage devices as they enter or exit a facility. The mobile reader includes multiple scanning modules that enable the mobile reader to scan the unique identifiers with multiple scanning methodologies. The mobile reader is configured to locate a misplaced data storage device, reconcile a list of expected data storage devices with a list of physical devices ready for transit, and initialize each data storage device with a unique identifier.

In this specification, RFID means radiofrequency identification and RF means radiofrequency.

Figure 1:
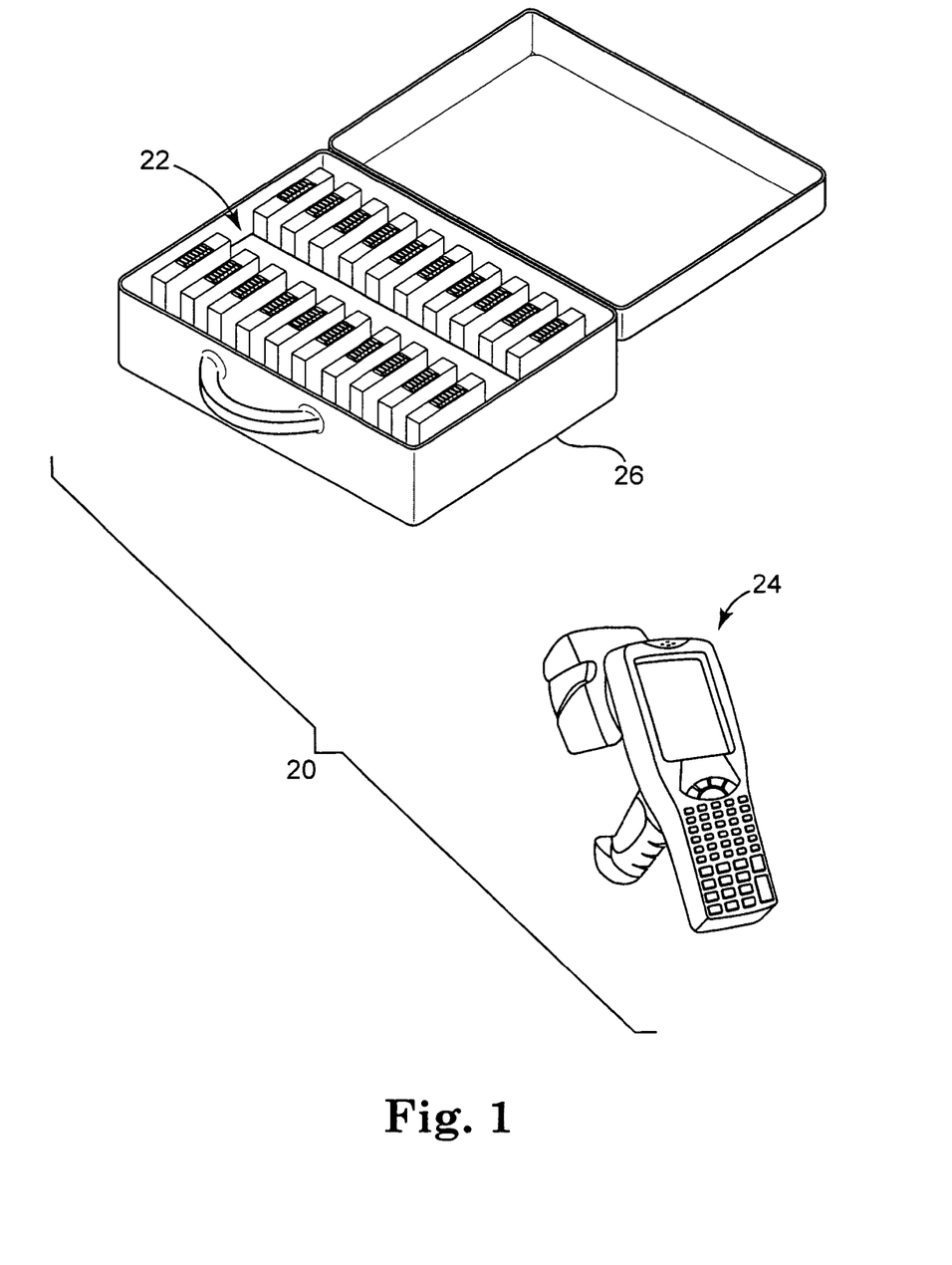
FIG. 1 is a perspective view of a data storage device tracing system including a container maintaining multiple in-transit data storage devices and a mobile reader configured to compile a scan list of the in-transit data storage devices according to one embodiment.

FIG. 1 is a perspective view of a data storage device tracing system 20 according to one embodiment. The tracing system 20 includes one or more data storage devices 22 and a mobile reader 24 configured to read an identifier of each of the data storage devices 22. In one embodiment, multiple data storage devices 22 are transported between physical locations, such as a storage repository and a business address, in an optional container 26. The container 26 is configured to safely retain the data storage devices 22, preferably such that a labeled back spine of the data storage devices 22 is oriented upwards as shown. In this manner, a person opening the container 26 may quickly view the information written on the labels. Other forms of containers are also acceptable, such as trolleys containing dozens of data storage devices 22, a box or satchel maintaining fewer than a dozen data storage devices 22, or the suitcase-like container 26 configured to uniformly orient about twenty data storage devices 22 in two columns of ten rows, for example.

Figure 2:
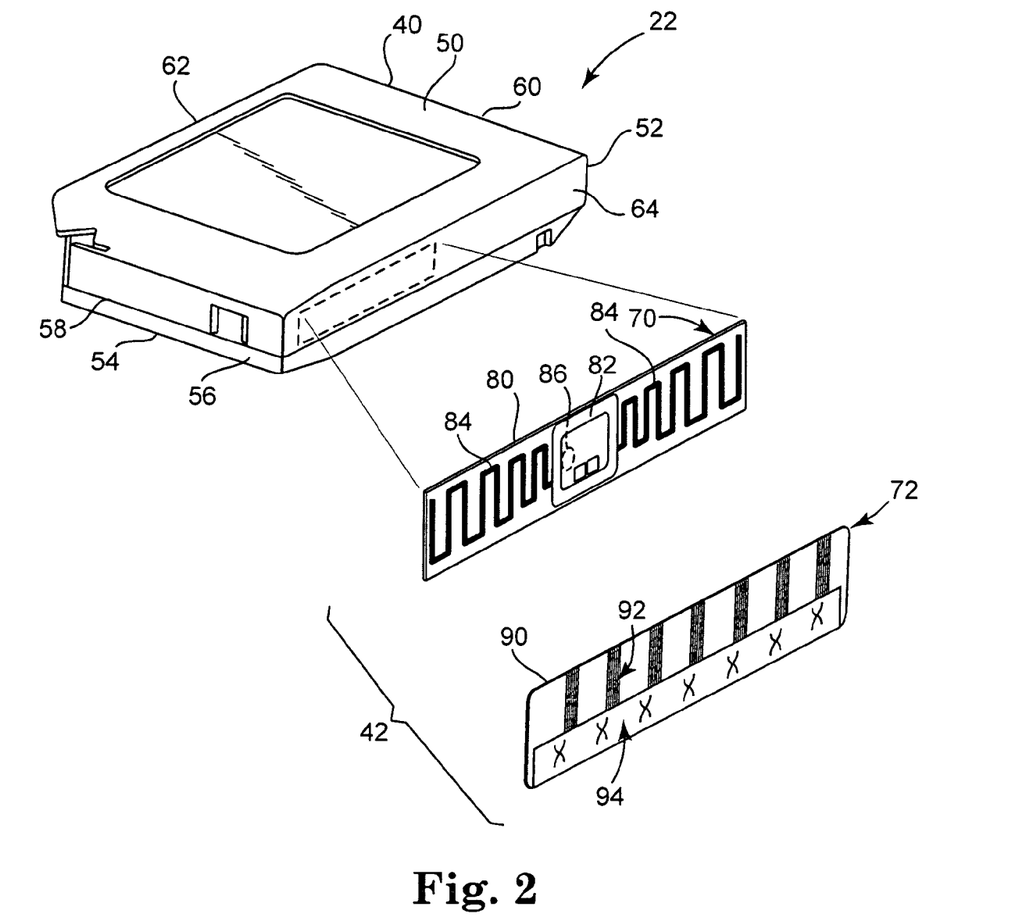
FIG. 2 is an exploded perspective view of a tag attachable to a housing of a data storage device according to one embodiment.

FIG. 2 is an exploded perspective view of one data storage device 22. In one embodiment, the data storage device 22 includes a housing 40 containing a data storage medium (not shown) and a label 42 or a tag 42 attachable to the housing 40. Any suitable data storage medium is acceptable; such that the data storage device 22 includes single reel magnetic tape data storage devices, dual reel magnetic tape data storage devices, micro-hard drive devices, hard disk drive devices, or scaleable linear recording devices. The housing 40 includes a variety of shapes and sizes suited to the data storage medium contained therein. In one embodiment, the housing 40 provides a first major surface 50 defined by a first housing section 52 opposite a second major surface 54 defined by a second housing section 56, where the major surfaces 50, 54 extend between opposing ends 58, 60 and opposing sides 62, 64. In one embodiment, side 64 provides a spine to which the tag 42 is attached.

In one embodiment, the tag 42 includes an inlay 70 attachable to the housing 40 and a label 72 attachable over the inlay 70 and to the housing 40. In one embodiment, the inlay 70 includes a substrate 80, a chip 82 attached to the substrate 80, an antenna 84 attached to the substrate 80 and coupled to chip 82, and an optional power source 86 configured to power chip 82 and antenna 84. The label 72 includes a substrate 90, a first optical field 92 printed on substrate 90, and a second optical field 94 printed on substrate 90 adjacent to first optical field 92. The substrate 90 includes any suitable plastic or paper substrate. In one embodiment, the first optical field 92 includes a barcode and the second optical field 94 includes a human-readable code both printed on the substrate 90.

In one embodiment, the tag 42 is an EPC Gen 2 Class 1 RFID tag configured to be programmed and/or read by software that is operated by the mobile reader 24 (FIG. 1). In one embodiment, the tag 42 is an ultra high frequency (UHF) tag. Other forms of the tag 42 are also acceptable, such as high frequency (HF) tags.

The substrate 80 includes any suitable plastic or paper substrate. The chip 82 is placed on or in the substrate 80. In one embodiment, the chip 82 is a memory chip capable of recording and/or storing device information, such as a format of data stored on the device 22 and a VOLSER number associated with the device 22. In one embodiment, the memory of the chip 82 stores a subset of data that is present on the optical label 72. In an alternative embodiment, the memory of the chip 82 stores all data that is present on the optical label 72 and includes fields including an 80 bit 10 character unique alphanumeric identifier, a two bit header, two bits of container information (device 22 is alone or device 22 is in a container), a four bit revision code, and an eight bit checksum as well as additional information that is not visually present on the label 72. In another embodiment, the chip 82 stores different field information for different forms of devices 22.

The chip 82 is preferably an electronic RFID memory chip having at least the memory capacity to be written with device information. In one embodiment, the chip 82 is an electronic RFID memory chip capable of retaining stored data even in a power "off" condition, and is, for example, a 512 bit RFID chip available from, for example, NXP, Eindhoven, The Netherlands. In another embodiment, the chip 82 is a 96 bit RFID chip. Those with skill in the art of memory chips will recognize that other memory formats and sizes for the chip 82 are also acceptable.

The chip 82 is programmed to have a specific content and format for the information stored in memory. In one embodiment, the chip 82 electronically stores a subset of the data present on the optical label 72 such as the format of the device 22 and the VOLSER number. In another embodiment, the chip 82 electronically stores all of the data present on the optical label 72 including the fields described above.

In one embodiment, the VOLSER number is a unique value that is specific to each data storage device it is associated with. In this specification, unique means an item exists as the only one such item. Thus, in one embodiment the VOLSER number specific to each data storage device identifies one and only one such data storage device, and there are no other data storage devices having that VOLSER number. This is in contrast to retail inventories having product labels, where any one label is employed to identify multiple items, such as any one of three dozen long sleeved shirts, or any one of seven cases of wine, and the sale or transaction of a shirt or one or more bottles of wine updates the number of shirts or bottles of wine still in inventory.

The VOLSER number can be user-defined or assigned by a manufacturer according to specifications provided by a customer. In general, the VOLSER number includes a character within the 80 bit field to mark the end of the VOLSER number, which enables the reading and interpretation of variable length and/or unique VOLSER numbers. In one embodiment, the bit pattern of the VOLSER number is not encrypted when reading or writing the VOLSER number to enable easy decoding by an outside source, such as a customer or client. In other embodiments, the VOLSER number is encrypted (for example by inverting the bits, or by a more complex encryption such as a variation of Data Encryption Standard (DES) or Advanced Encryption Standard (AES)) to prevent decoding by an outside source, or encoded to save space in the memory of the chip 82.

In one embodiment, a check value is employed as a check value against a block of data, such as a packet of network traffic or a block of a computer file. A check value is a small, fixed number of bits that can be employed to detect errors after transmission or storage of data. For example, in one embodiment, the check value is computed and appended before transmission or storage, and verified afterwards by a recipient to confirm that no changes occurred on transmission of the data. Advantages of check values are that they are easily implemented in binary hardware, they can be analyzed mathematically, and are useful in detecting common errors caused by noise in transmission channels (for example, a cyclic redundancy check (CRC) such as CRC 8 ATM, or CRC 16, or CRC 32 IEEE 802.3).

In other embodiments, a parity check or other function may be employed to generate the check value for the data. A parity check usually refers to a check value that is the exclusive-or of the data being checked.

In one embodiment, the antenna 84 is an ultra high frequency (UHF) antenna that is integrated within the chip 82 and the inlay 70. Other forms of the antenna 84 are also acceptable. In general, the antenna 84 is configured to electromagnetically interact with the mobile reader 24 (FIG. 1) in receiving/sending data. With this in mind, in one embodiment the antenna 84 is a UHF-compatible EPC GEN 2 Class 1 RF antenna operable between 860-960 MHz and is configured to communicate information stored on the chip 82 to a transceiver module (not shown) in the mobile reader 24 (FIG. 1).

When the tag 42 is a passive RFID tag, it does not employ its own power source and power source 86 is optional. In this regard, the passive RFID tag is "powered" whenever access to the tag is initiated by the mobile reader 24 (FIG. 1). In one embodiment, the device tag 42 is a passive RFID tag having a practical read range of up to approximately 6 feet (about 2 meters) with a 0.5 Watt reader. In other embodiments, tag 42 is an active tag and power source 86 is a battery that powers the antenna 84 and/or the chip 82.

Figure 3:
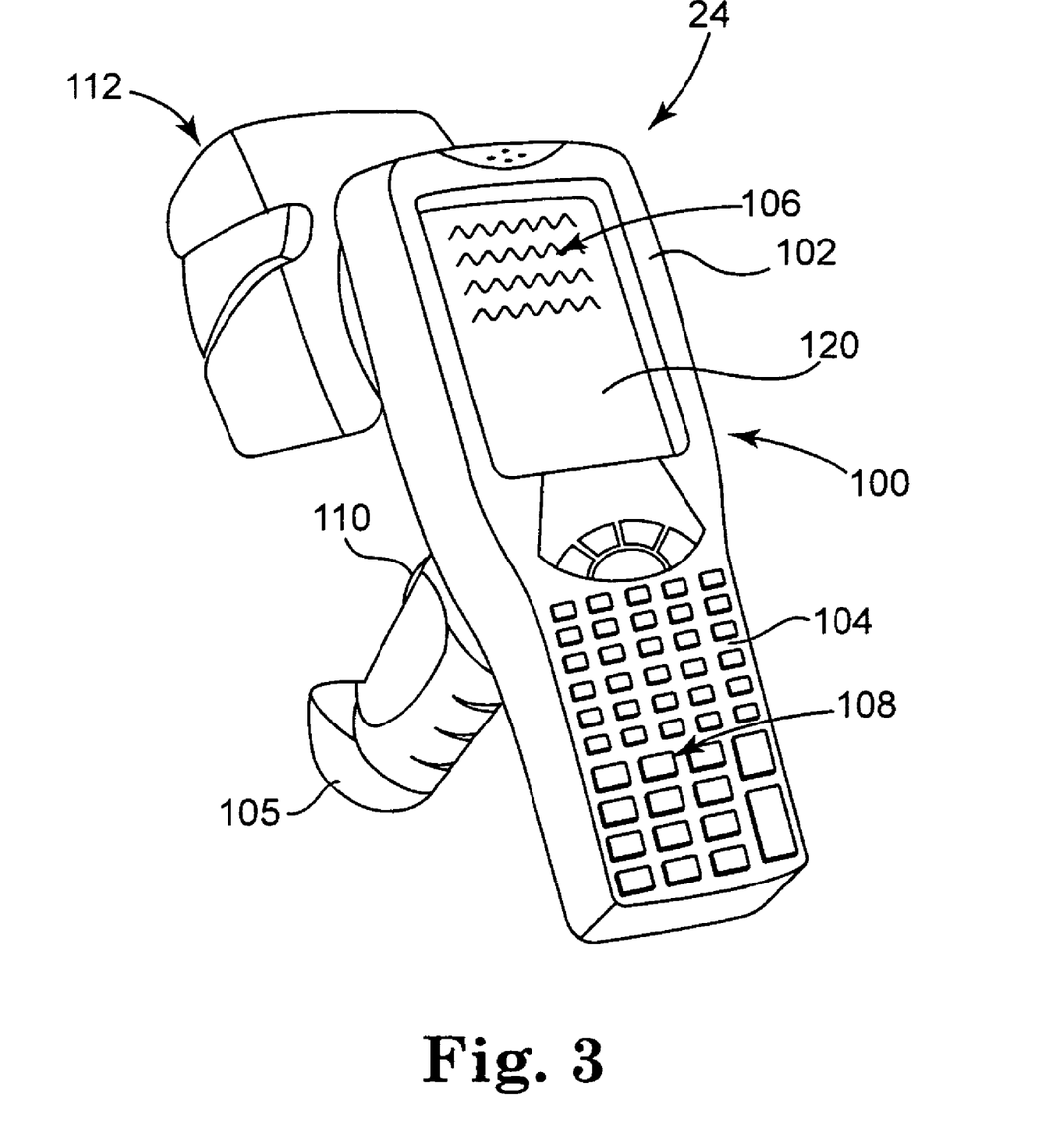
FIG. 3 is a perspective view of the mobile reader shown in FIG. 1.

FIG. 3 is a perspective view of the mobile reader 24 according to one embodiment. The mobile reader 24 is sized to be conveniently used and ported in a hand-held manner by an individual. In one embodiment, the mobile reader 24 includes a housing 100 having a display platform 102, a keypad 104 extending from the display platform 102, and a handle 105 extending from the display platform 102. The display platform 102 provides a user interface 106, the key pad 104 includes multiple keys 108, and the handle 105 includes a trigger 110 that is configured to activate the reader 24 according to an input selected by the user through the interface 106 or the keys 108. In one embodiment, the mobile reader 24 includes an external antenna 112 coupled to a forward portion of the housing 100. Other forms of reader antenna are also acceptable, including antennas internal to the housing 100.

In one embodiment, the mobile reader 24 is modified to utilize software that enables the interface 106 to guide a user in scanning, reading, writing, locating, reconciling, and/or initializing RF-enabled tags 42 coupled to the data storage devices 22, as best illustrated in FIGS. 6-9 below. One suitable reader that may be so modified includes a Motorola 9090G Handheld Reader, available from Motorola, Inc., Holtsville, N.Y. Other suitable readers employing the software to drive the interfaces 106 described below are also acceptable.

In one embodiment, the display platform 102 includes a display screen 120 having a size of about 3.8 inches on the diagonal and is configured to display information in monochrome or color. In one embodiment, the interface 106 operates on a Windows™ platform. In one embodiment, the reader 24 includes one or more circuit modules insertable into a back plane of the housing 100 and a removable battery or battery pack (not shown). In one embodiment, the removable battery includes a rechargeable 7.2 volt lithium ion 2200 mAh battery pack having a life between charges of about 16 watt hours.

In one embodiment, the mobile reader 24 includes a central processing unit such as an Intel™ XScale Bulverde™ PXA270 processor operating at 624 MHz on the Microsoft™ Windows™ operating system. Suitable memory for mobile reader 24 includes 64 megabyte memory and can include one or more expansion memory cards. In one embodiment, the mobile reader 24 is configured for 100 mW output power with a data rate between about 11-54 mbps, operates at a frequency range of between 2.4 GHz-5 GHz, and is Bluetooth compatible.

In one embodiment, the key pad 104 includes 53 keys and antenna 112 is radio frequency compatible having an RFID integrated linearly polarized antenna with a nominal read range of between 0.2-10 ft. and a nominal write range of between 1-2 ft.

In one embodiment, mobile reader 24 includes one or more circuit modules (See FIG. 4) that are operable by pressing trigger 110 or selecting an appropriate input on interface 106.

Figure 4:
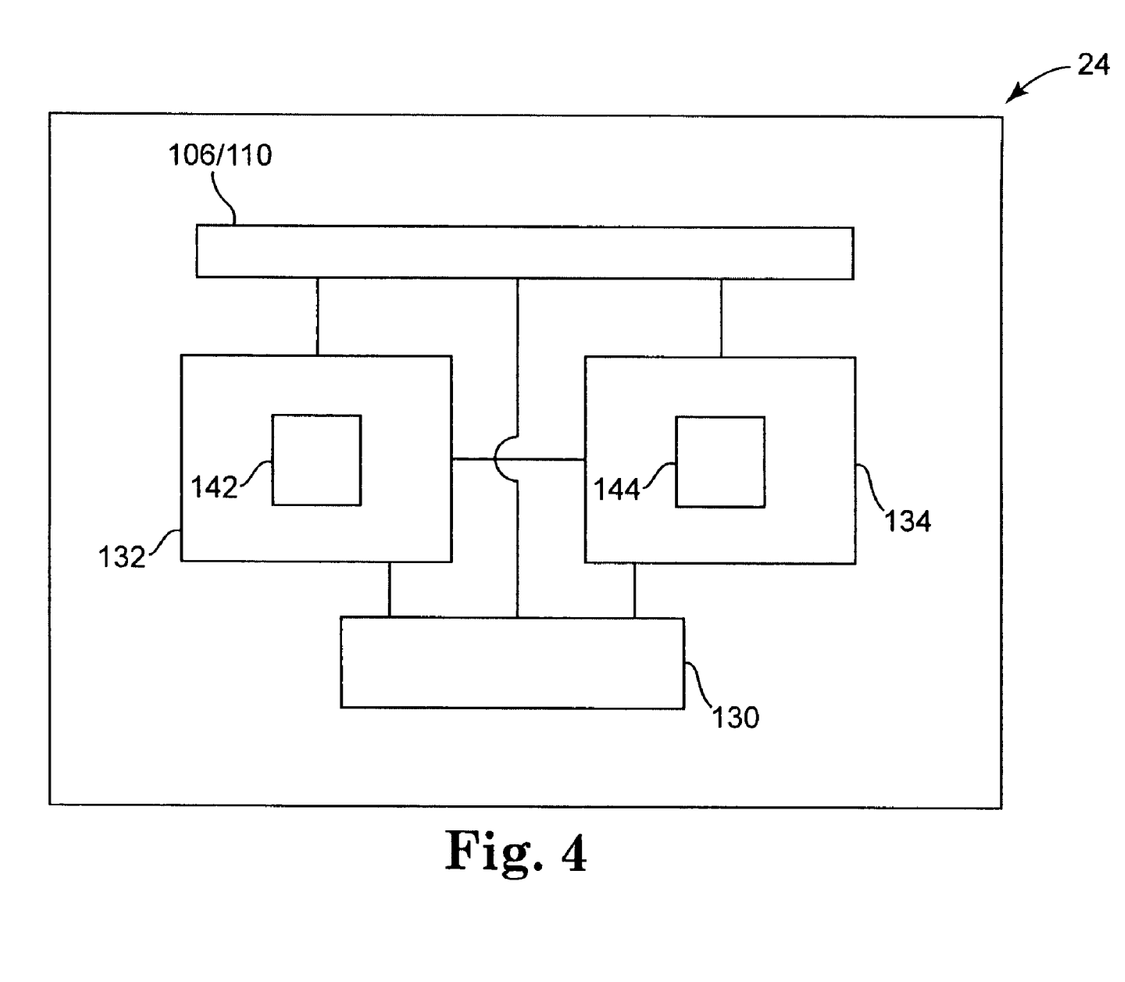
FIG. 4 is a schematic diagram of electronic circuitry employed by the mobile reader shown in FIG. 3.

FIG. 4 is a schematic diagram of electronic circuitry employed by the mobile reader 24 (FIG. 3) according to one embodiment. The mobile reader 24 is configured to RF scan the tags 42 on the data storage device 22 (FIG. 2) or barcode scan the tags 42. The mobile reader 24 includes electronic components configured to facilitate scanning of the tags 42 in a variety of user-activated manners. For example, in one embodiment the mobile reader 24 includes an operating system 130 electrically coupled to a RF scanning module 132 and electrically coupled to a separate barcode scanning module 134, where both of the RF scanning module 132 and the barcode scanning module 134 electrically couple with the user interfaces 106/110.

In one embodiment, the operating system 130 is compatible with Microsoft™ Windows™ Mobile 5.0 premium operating system, although other suitable operating systems are also acceptable. In one embodiment, RF scanning module 132 includes a radio frequency scanning circuitry (RFSC) 142 and the barcode scanning module 134 includes barcode scanning circuitry (BCSC) 144. In one embodiment, the RF scanning module 132 including the RFSC 142 is electrically coupled with the barcode scanning module 134 that includes the BCSC 144. In this manner, a user operating interface 106/110 may select one or the other of the RF scanning module 132 or the barcode scanning module 134 to scan the unique storage device identifier maintained on the tag 42.

Figure 5:
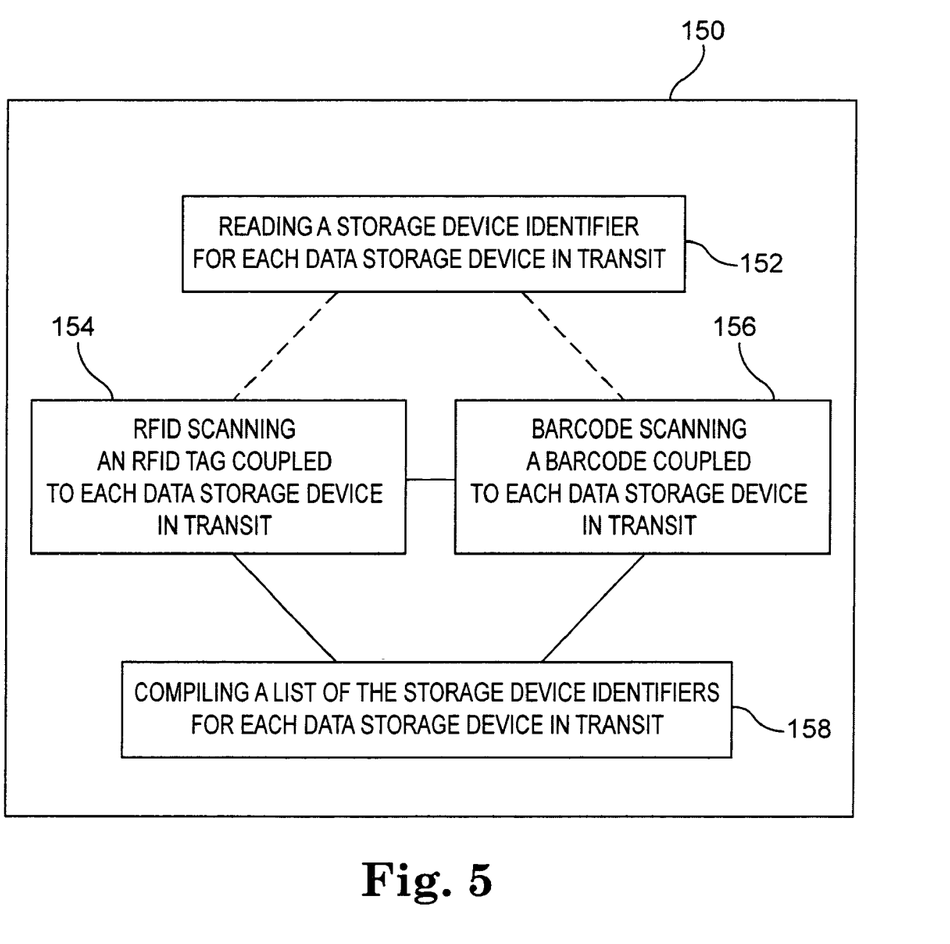
FIG. 5 is a diagram of a flow chart employed by the data storage device tracing system of FIG. 1 according to one embodiment.

FIG. 5 is a schematic diagram of a process 150 for identifying data storage devices for transport. The process 150 includes reading a storage device identifier for each data storage device in transit at 152. The process 150 includes one of RFID scanning at 154 or barcode scanning at 156. In particular, 154 provides RFID scanning an RFID tag coupled to each data storage device in transit, and 156 provides barcode scanning a barcode coupled to each data storage device in transit. Either the RFID scanning at 154 or the barcode scanning at 156 will result in reading the unique storage device identifier present on the tag 42 (FIG. 2) for each of the data storage devices 22 (FIG. 2). Ultimately, the process 150 provides compiling a list of the storage device identifiers for each data storage device in transit at 158.

FIG. 6-FIG. 9 provide examples of employing the mobile reader 24, and software implemented by the mobile reader 24, to compile a list of data storage devices scheduled for transit, enabling the tracking of the data storage devices between two or more locations.

Figure 6:
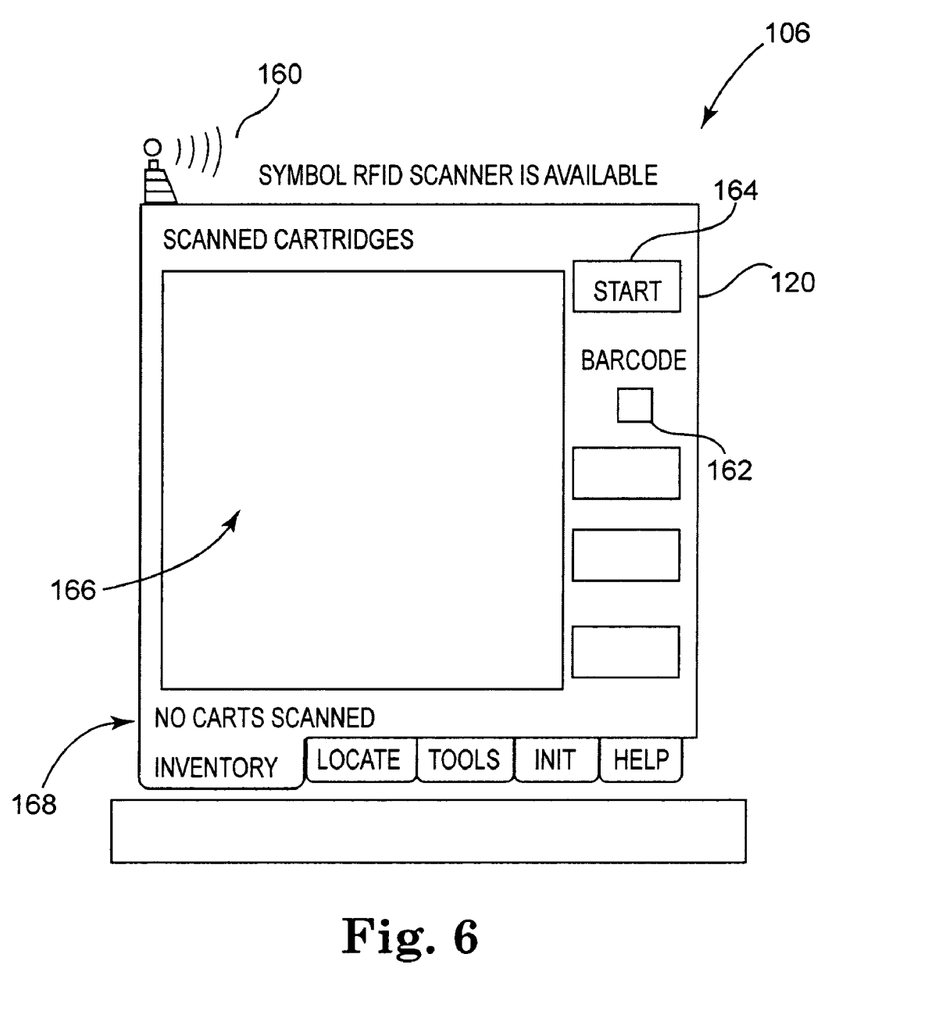
FIG. 6 is a front view of a display interface of the mobile reader shown in FIG. 3 according to one embodiment.

FIG. 6 is a front view of the screen 120 of the interface 106. The screen 120 is employed to enable scanning of data storage devices and present a scrollable list of the scanned unique identifiers of the data storage devices in-transit. The screen 120 indicates at 160 that the RFID scanner is available and that the barcode scanner is available (but not selected) at 162. Selecting or activating start button 164 initiates RFID scanning of data storage devices within range of the mobile reader 24 to create a scrollable list 166 of cartridges that have been scanned and identified for transit.

The scrollable list 166 will identify the devices or data cartridges that have been successfully scanned, which is useful in the case that a known quantity of devices is prepared for transport (for example, a container of twenty cartridges). This enables the user to see at a glance whether the expected quantity of devices has been scanned. A separate line 168 is provided to sum the cartridges that have been scanned ("No Carts Scanned" indicates that no devices were detected/scanned, which will be the case when a new scan is just initiated). A complete scan of twenty data storage devices 22 for transport would result in line 168 reading "20 carts scanned."

Figure 7:
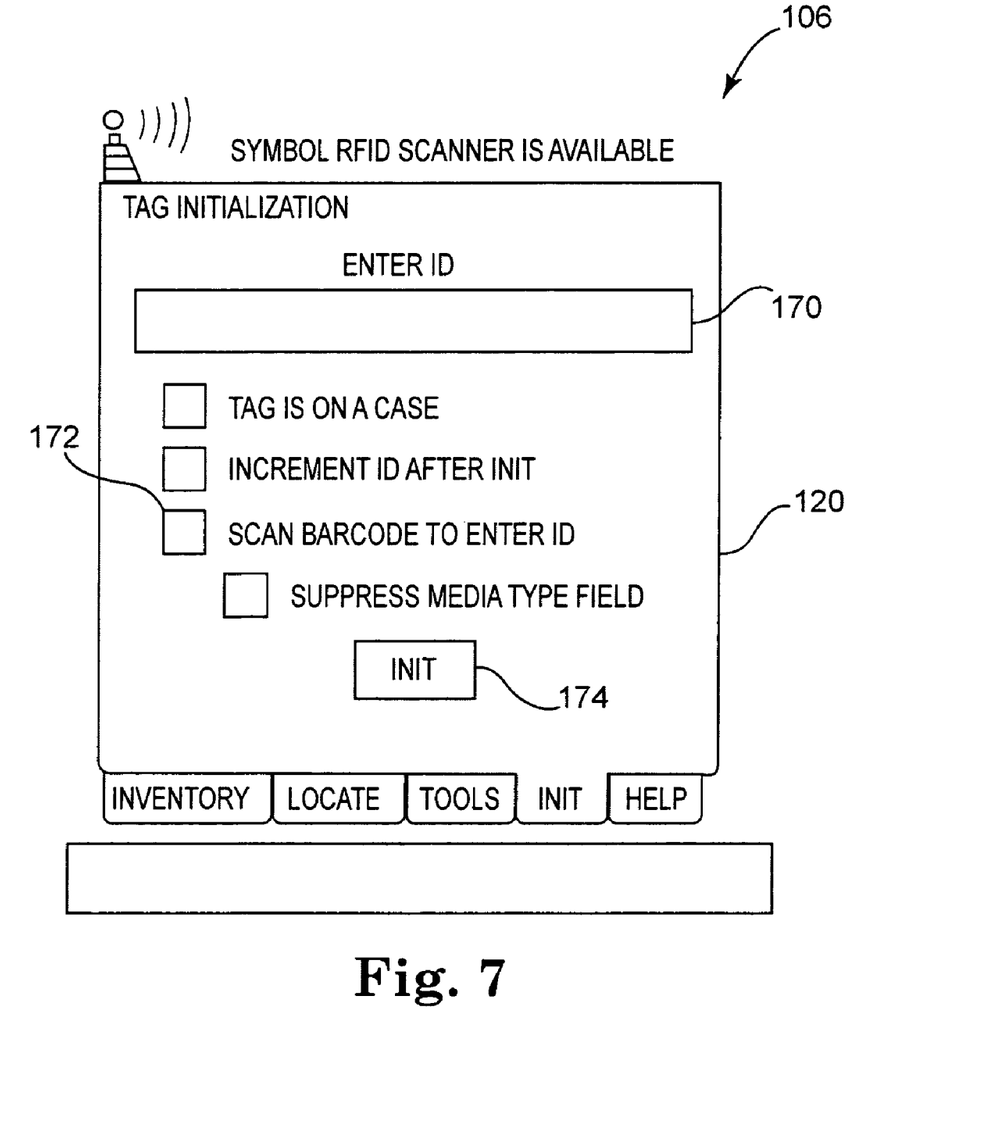
FIG. 7 is a front view of the display interface of the mobile reader shown in FIG. 3 according to another embodiment.

FIG. 7 is a front view of the interface 106 in which the screen 120 is employed to initialize a data storage device 22 for transport. In one embodiment, the user is enabled to enter the unique storage device identifier at field 170. In another embodiment, the user selects box 172 on the interface 106 to activate the direct barcode scanning of the unique identifier from the tag 42 into field 170. Box 172 is replaceable with a radio button or any suitable binary input option displayed on the interface for activating barcode scanning. For example, with reference to FIG. 4, in one embodiment BCSC 144 is employed to input a VOLSER number from a listing of unique VOLSER numbers and feed this VOLSER number to RFSC 142. Subsequently, the RFSC 142 writes an encoded data string including the VOLSER number to the tag 42 on the data storage device 22. For example, in one embodiment the initialization button 174 is activated to begin barcode scanning of a VOLSER number that is fed into the RFID circuitry of the RFSC 142, which writes the encoded data string to the tag 42.

Figure 8:
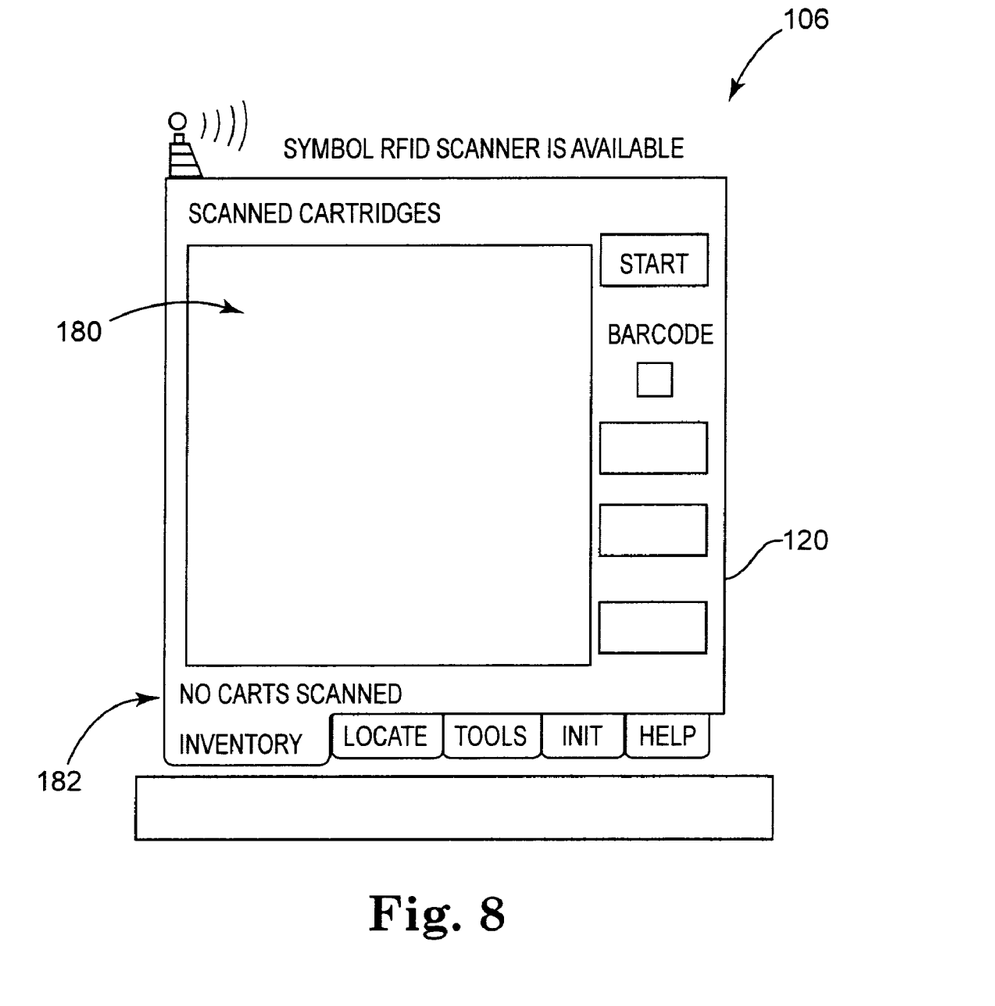
FIG. 8 is a front view of the display interface of the mobile reader shown in FIG. 3 according to another embodiment.

FIG. 8 is a front view of the screen 120 of the interface 106 employed to import a list of storage devices that are expected to be scanned by the mobile reader 24. In one embodiment, mobile reader 24 provides a visual alert to the operator via the screen 120 when an item that is not on the list is scanned. Auditory alerts provided by the mobile reader 24 are also within the scope of this disclosure.

The screen 120 includes a scrollable list 180 of tags 42 that have been presented to the mobile reader 42. The scrollable list 180 is configured to be imported into tape tracking software of system 20 where a reconciliation step occurs. In the reconciliation step, the list of scanned items (which would appear in the scrollable list 180) is compared to the list of expected items and the differences between the two are reconciled by the operator using the interface 106. In one embodiment, the interface 106 includes an information field 182 to alert the operator to a discrepancy in the reconciliation list. In one embodiment, the list of expected items is imported by the mobile reader 24 and compared in real time to the scanned items. In this manner, the operator is alerted early in the transit process that a potential discrepancy exists between items scanned and items expected for transport.

Figure 9:
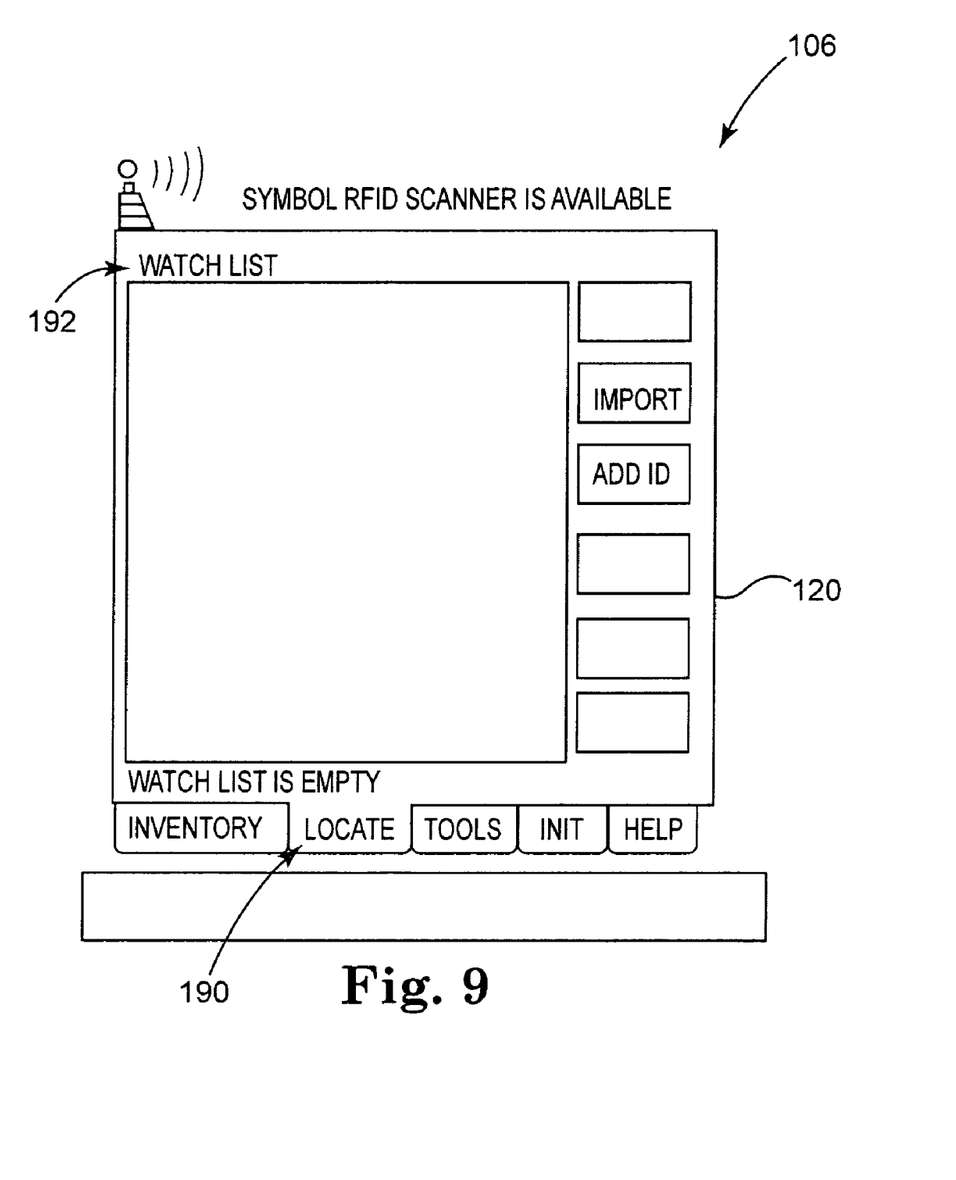
FIG. 9 is a front view of the display interface of the mobile reader shown in FIG. 3 according to another embodiment.

FIG. 9 is a front view of the screen 120 of the interface 106 employed to locate a lost or misplaced data storage device. In one embodiment, the interface 106 includes a locate function 190 that is activated to cause the mobile reader 24 to continuously scan for a storage device identifier placed on a watch list 192. The locate function 190 is employed to quickly find an item of interest that may be stored with a vast number of similar such items. For example, in a data center there is often a desire to locate a single lost or misplaced data storage device in a collection of a hundreds or thousands of similar such devices. Searching racks of devices for one particular item is both tedious and error prone. The locate function 190 enables the operator to either manually enter an item number into the watch list 192 or import a text file containing a list of storage device identifiers to be "watched." When the locate function 190 is activated, the mobile reader 24 continuously scans with the RFSC 142 (FIG. 4) the various tags 42 on multiple storage devices 22. As the mobile reader 24 scans, it compares the identifier read from each tag within scan range to the identifier entered in the watch list 192. When a lost or misplaced item present on the watch list is located, the operator is notified or alerted by the interface 106, for example by a text message on screen 120, or by an audible alert emitted by the mobile reader 24.

Embodiments described herein provide a mobile reader for a data storage device tracing system that is configured to RF scan or barcode scan an identifier on each tag attached to a data storage device. In addition, the mobile reader is configured to locate misplaced data storage devices, reconcile a list of expected data storage devices with a list of physical devices ready for transit, and initialize each data storage device with a unique identifier.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments of mobile readers employed in electronic data storage device tracing systems as discussed herein. Therefore, it is intended that this invention be limited only by the claims and the equivalents thereof.

What is claimed is:

1. A mobile reader configured to compile a list of data storage devices for transport, the mobile reader comprising:
   an interface electrically coupled to circuitry modules including:
      RFID scanning circuitry configured to read a unique storage device identifier from each of the data storage devices, and
      barcode scanning circuitry configured to read the unique storage device identifier from each of the data storage devices, the barcode scanning circuitry communicating with the RFID scanning circuitry;
   wherein the interface comprises a user operable function that enables selectively reading the unique storage device identifier with one of the RFID scanning circuitry and the barcode scanning circuitry to compile a scan list of in-transit data storage devices and wherein the user operable function comprises a binary input option displayed on the interface.

2. The mobile reader of claim 1, further comprising:
   a housing maintaining an RFID scanning circuitry module and a barcode scanning circuitry module, the housing comprising a display platform including the interface comprising the user operable function and a handle extending from the display platform, the handle including a trigger configured to initiate scanning with one of the RFID scanning circuitry module and the barcode scanning circuitry module.

3. The mobile reader of claim 2, wherein the unique storage device identifier comprises a separate VOLSER number for each of the data storage devices and activation of the trigger is further configured to initialize a tag of each of the data storage devices with an encoded data string that comprises the VOLSER number.

4. The mobile reader of claim 3, wherein upon initialization the barcode scanning circuitry iteratively inputs at least the separate VOLSER number for each data storage device to the RFID scanning circuitry and the RFID scanning circuitry writes the encoded data string including the separate VOLSER number for each data storage device to a respective tag of each data storage device.

5. The mobile reader of claim 1, wherein the interface operates software comprising a locate function, the locate function configured to continuously scan and read VOLSER numbers from RFID tags of the data storage devices, compare the read VOLSER numbers to a VOLSER number of interest, and issue an alert upon finding the VOLSER number of interest.

6. A data storage device tracing system comprising:
a data storage device including a housing enclosing data storage media and a tag coupled to the housing; and
a mobile reader including:
an RFID scanner configured to read a unique storage device identifier from the tag and input the storage device identifier into a scan list of in-transit data storage devices,
a barcode scanner configured to read the storage device identifier from the tag and input the storage device identifier into the scan list of in-transit data storage devices, and
an interface comprising a user operable function that enables selectively reading the unique storage device identifier with one of the RFID scanner and the barcode scanner to compile a scan list of in-transit data storage devices and wherein the user operable function comprises a binary input option displayed on the interface;
wherein the mobile reader is configured to select between the RFID scanner and the barcode scanner in compiling the scan list of in-transit data storage devices.

7. The data storage device tracing system of claim 6, wherein the RFID scanner is operably linked to the barcode scanner.

8. The data storage device tracing system of claim 6, wherein the tag comprises an RFID inlay and an optical label disposed on the RFID inlay, the RFID inlay including an RFID chip and the optical label including a barcode.

9. The data storage device tracing system of claim 8, wherein the storage device identifier comprises a unique VOLSER number for each data storage device and the mobile reader is configured to initialize the RFID chip with at least a portion of the storage device identifier.

10. The data storage device tracing system of claim 9, wherein the barcode scanner is configured to read the storage device identifier from the barcode and communicate the VOLSER number to the RFID scanner, and the RFID scanner is configured to write an encoded data string including the VOLSER number to the RFID chip.

11. The data storage device tracing system of claim 9, comprising multiple data storage devices, and the mobile reader comprises a locate function that is configured to continuously scan and read each VOLSER number, compare the read VOLSER number to a separate VOLSER number of interest, and issue an alert upon finding the VOLSER number of interest.

12. A method of identifying data storage devices for transport, the method comprising:
reading a unique storage device identifier for each data storage device in transit, wherein reading comprises one of:
RF scanning an RFID tag coupled to each data storage device in transit;
barcode scanning a barcode coupled to each data storage device in transit; and
compiling a list of the storage device identifiers for each data storage device in transit, the method further comprising:
locating a misplaced data storage device by recording a misplaced data storage device identifier;
continuously reading a storage device identifier from each one of a plurality of data storage devices; and
comparing the misplaced data storage device identifier with the read storage device identifier from each one of the plurality of data storage devices.

13. The method of claim 12, wherein recording a misplaced data storage device identifier comprises manually entering a misplaced data storage device identifier into a watch list.

14. The method of claim 12, wherein recording a misplaced data storage device identifier comprises importing a misplaced data storage device identifier into a watch list.

15. The method of claim 14, wherein importing a misplaced data storage device identifier into a watch list comprises one of barcode scanning and importing text of a misplaced data storage device identifier into a watch list.

16. The method of claim 12, further comprising:
initializing the RFID tag coupled to each data storage device in transit.

17. A method of identifying data storage devices for transport, the method comprising:
reading a unique storage device identifier for each data storage device in transit, wherein reading comprises one of:
RF scanning an RFID tag coupled to each data storage device in transit;
barcode scanning a barcode coupled to each data storage device in transit; and
compiling a list of the storage device identifiers for each data storage device in transit, the method further comprising:
importing the compiled list of the storage device identifiers into tracking software of an electronic data storage device tracing system;
comparing the compiled list with a list of expected data storage devices in transit; and
reconciling the compiled list with the list of expected data storage devices in transit.

18. A method of identifying data storage devices for transport, the method comprising:
reading a unique storage device identifier for each data storage device in transit, wherein reading comprises one of:
RF scanning an RFID tag coupled to each data storage device in transit;
barcode scanning a barcode coupled to each data storage device in transit; and compiling a list of the storage device identifiers for each data storage device in transit, the method further comprising:
initializing the RFID tag coupled to each data storage device in transit,
wherein initializing the RFID tag comprises:
barcode scanning the storage device identifier from each data storage device in transit;
passing the storage device identifier from barcode scanning circuitry to RFID scanning circuitry; and
writing an encoded data string including a VOLSER number unique to each data storage device in transit to the RFID tag with the barcode scanning circuitry.

19. A mobile reader configured to compile a list of data storage devices, the mobile reader comprising:
an interface electrically coupled to circuitry modules including:
RFID scanning circuitry configured to read a unique storage device identifier from each of the data storage devices, and
barcode scanning circuitry configured to read the unique storage device identifier from each of the data storage devices, the barcode scanning circuitry communicating with the RFID scanning circuitry;
wherein the interface comprises a user operable function that enables selectively reading the unique storage device identifier with one of the RFID scanning circuitry and the barcode scanning circuitry to compile a scan list of data storage devices and wherein the user operable function comprises a binary input option displayed on the interface.

* * * * *